United States Patent [19]

Okabe

[11] Patent Number: 4,527,462
[45] Date of Patent: Jul. 9, 1985

[54] SEALED-TYPE AUTOMATIC TENSIONER

[75] Inventor: Yoshio Okabe, Kariya, Japan

[73] Assignee: Aisin Seiki Kabushiki Kaisha, Japan

[21] Appl. No.: 597,352

[22] Filed: Apr. 6, 1984

[30] Foreign Application Priority Data

Apr. 8, 1983 [JP] Japan ............................... 58-51461[U]
Apr. 8, 1983 [JP] Japan ............................... 58-51462[U]
Apr. 8, 1983 [JP] Japan ............................... 58-51463[U]

[51] Int. Cl.³ ............................................. F01B 7/20
[52] U.S. Cl. ................................. 92/51; 92/130 R; 92/130 D; 474/110
[58] Field of Search ................. 92/51, 52, 130 R; 474/103, 104, 110, 111

[56] References Cited

U.S. PATENT DOCUMENTS

| | | | |
|---|---|---|---|
| 2,191,946 | 2/1940 | Weller | 74/242.11 |
| 2,815,740 | 12/1957 | Slater | 123/90 |
| 3,455,178 | 7/1969 | Ruoff et al. | 474/111 |
| 3,574,418 | 4/1971 | Okabe | 305/10 |
| 3,875,908 | 4/1975 | Ayres | 123/90.36 |
| 3,960,026 | 6/1976 | Hibino | 74/242.11 |

FOREIGN PATENT DOCUMENTS

| | | | |
|---|---|---|---|
| 474889 | 10/1952 | Italy | 474/110 |
| 59051 | 5/1981 | Japan | 474/111 |

*Primary Examiner*—Paul E. Maslousky
*Attorney, Agent, or Firm*—Finnegan, Henderson, Farabow, Garrett & Dunner

[57] ABSTRACT

A sealed-type automatic tensioner has a body assembly composed of upper and lower tubular bodies held in threaded engagement with each other, a tubular plunger slidably disposed in the body assembly, a piston slidably disposed in the tubular plunger and having a portion extending slidably through a hole in a top wall of the upper tubular body. The lower tubular body and the tubular plunger jointly define a larger-diameter hydraulic chamber, and the tubular plunger and the piston jointly define a smaller-diameter hydraulic chamber. A bottom wall of the tubular plunger has an aperture through which the larger- and smaller-diameter chambers communicate with each other. A compression coil spring is disposed in the first tubular body and acts between the top wall of the upper tubular body and the tubular plunger for normally urging the tubular plunger to move into the larger-diameter chamber.

7 Claims, 4 Drawing Figures

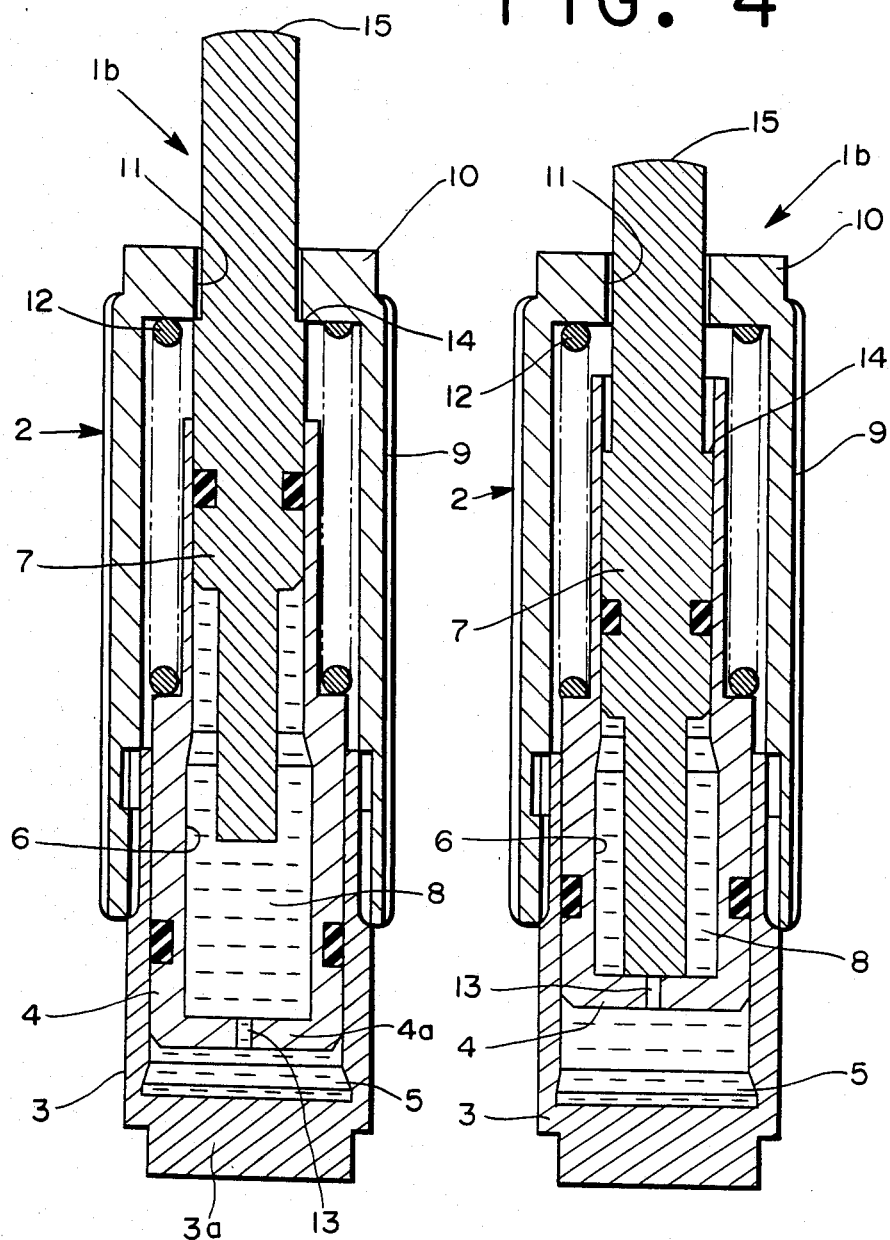

SEALED-TYPE AUTOMATIC TENSIONER

BACKGROUND OF THE INVENTION

1. Field of the Invention

The present invention relates to a hydraulic sealed-type automatic tensioner for tensioning belts, chains and the like.

2. Description of the Prior Art

There are known various hydraulic automatic tensioners for tensioning belts, chains and the like, the tensioners being analogous in structure to hydraulic lifters used in the valve trains of internal combustion engines. One conventional design of such hydraulic lifter or hydraulic automatic tensioner is of the open type used with an oil pan as disclosed in U.S. Pat. No. 3,875,908. Another prior hydraulic lifter has a sealed construction as shown in U.S. Pat. No. 2,815,740. The open-type automatic tensioner can only be used in limited locations as it requires to be combined with the oil pan. The hydraulic automatic tensioner of the sealed design utilizes axial movement of a plunger in a body, and also finds only limited use since the plunger has a large diameter and a small stroke.

SUMMARY OF THE INVENTION

It is an object of the present invention to provide a sealed-type automatic tensioner which prevents dust or foreign matter from entering a body assembly of the tensioner, and which has a piston smoothly slidable in the body assembly for a relatively large stroke.

According to the present invention, a sealed-type automatic tensioner comprises a body assembly composed of a pair of first and second interengaging tubular bodies having top and bottom walls, respectively, the top wall having a hole defined theretrough, a tubular plunger slidably disposed in the body assembly and having a bottom wall, the second tubular body defining a larger-diameter chamber therein axially between the bottom wall of the second tubular body and the bottom wall of the tubular plunger, a piston slidably disposed in the tubular plunger and having a portion extending slidably through the hole in the top wall of the first tubular body, the tubular plunger having a central bore defining a smaller-diameter chamber axially between the piston and the bottom wall of the tubular plunger, the bottom wall of the tubular plunger having an aperture through which the larger- and smaller-diameter chambers communicate with each other, the larger- and smaller-diameter chambers being filled with a hydraulic medium, and a spring disposed in the first tubular body and acting between the top wall of the upper tubular body and the tubular plunger for normally urging the tubular plunger to move in a direction into the larger-diameter chamber.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3 is a longitudinal cross-sectional view of an automatic tensioner according to still another embodiment of the present invention;

FIG. 4 is a longitudinal cross-sectional view of the automatic tensioner shown in FIG. 3, illustrating the parts shifted to their full stroke.

Like or corresponding parts are denoted by like or corresponding reference characters throughout the views.

DESCRIPTION OF THE PREFERRED EMBODIMENTS

Figure 1:
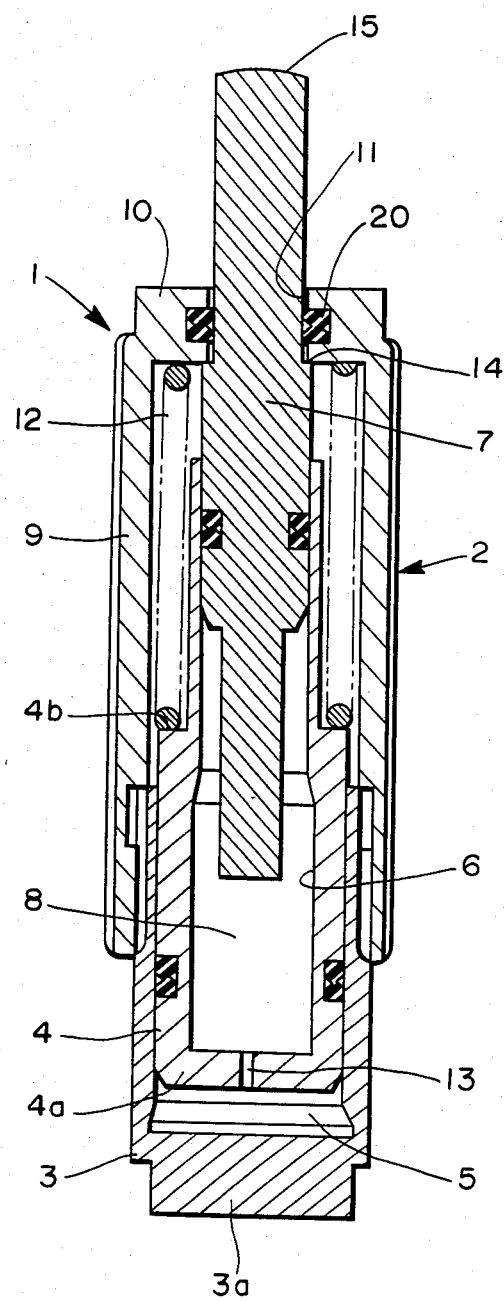
FIG. 1 is a longitudinal cross-sectional view of an automatic tensioner according to an embodiment of the present invention.

FIG. 1 shows a hydraulic automatic tensioner constructed in accordance with an embodiment of the present invention.

The hydraulic automatic tensioner, generally designated at 1, is of the sealed type comprising a body assembly 2 composed of an upper tubular body 9 and a lower tubular body 3 having one end threaded in the upper tubular body 9. A tubular plunger 4 is slidably disposed in the lower body 3. A larger-diameter hydraulic chamber 5 is defined in the lower tubular body 3 between a bottom wall 3a of the lower tubular body 3 and a bottom wall 4a of the tubular plunger 4. The tubular plunger 4 has a central bore 6 in which a piston 7 is slidably disposed. The central bore 6 and the piston 7 define a smaller-diameter hydraulic chamber 8.

The piston 7 has one end projecting slidably through a hole 11 defined in a top wall 10 of the upper tubular body 3. An annular dust seal 20 is retained in the top wall 10 and extends around an upper portion of the piston 7 which is held in sliding contact with the annular dust seal 20. A compression coil spring is disposed in the upper tubular body 9 around the piston 7 and has opposite ends seated on the top wall 10 of the upper tubular body 9 and a spring seat 4b of the plunger 4. The compression coil spring 12 normally urges the plunger 4 to move in a direction into the lower tubular body 3.

The larger- and small-diameter chambers 5, 8 are filled with oil and held in communication with each other through an aperture 13 defined axially through the bottom wall 4a of the plunger 4. The piston 7 has an annular shoulder 14 engageable with the top wall 10 of the upper tubular body 9 to limit the length of the piston 7 which projects out of the upper tubular body 9. The piston 7 has an upper end surface 15 serving as an acting surface pressed against a belt, chain or the like directly or through an intermediary member.

When an external force is applied to the acting surface 15 of the piston 7, the piston 7 is retracted into the plunger 4 to produce a pressure buildup in the smaller-diameter chamber 8. The pressure buildup is transmitted from the smaller-diameter chamber 8 into the larger-diameter chamber 5 through the aperture 13, and acts on the bottom wall 4a of the plunger 4. The pressure buildup in the larger-diameter chamber 5 is increased until it is counterbalanced by the resilient force of the compression coil spring 19.

The sliding movement of the piston 7 and the plunger 4 is kept smooth at all times in operation since unwanted dust or foreign matter is prevented by the dust seal 15 from entering through the hole 11 into the upper body 9. Since the piston 7 is guided by the plunger 4 and the top wall 10 of the upper body 9, the piston 7 will be moved axially in its strokes in smooth fashion.

Figure 2:
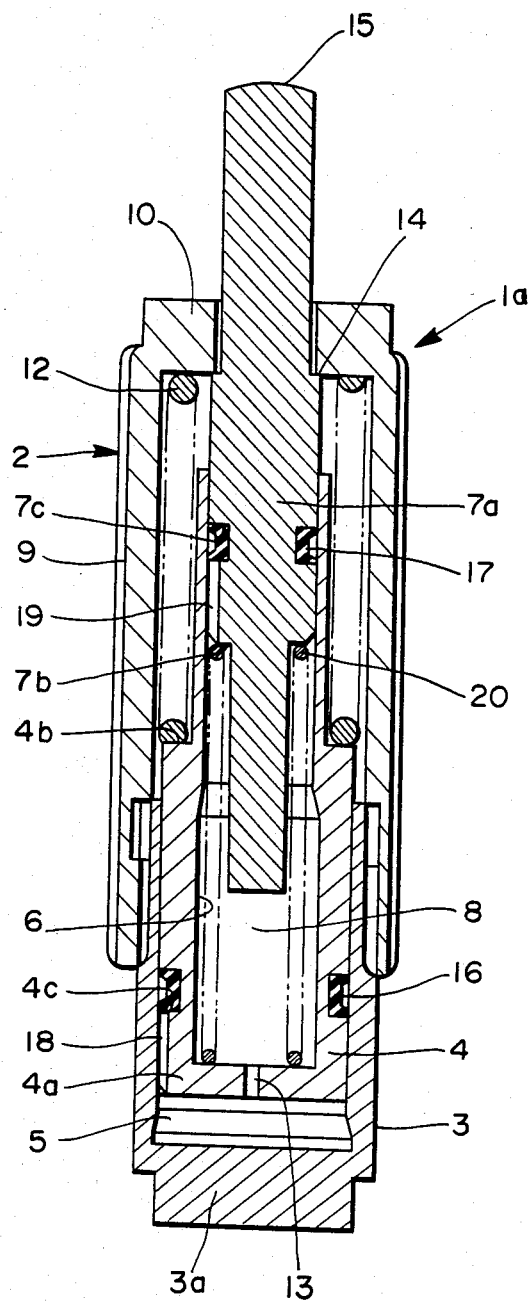
FIG. 2 is a longitudinal cross-sectional view of an automatic tensioner according to another embodiment of the present invention.

FIG. 2 illustrates a hydraulic automatic tensioner 1a according to another embodiment. A tubular plunger 4 has an annular seal groove 4c defined in an outer peripheral surface thereof and receiving an annular seal 16 acting against the inner peripheral surface of the lower tubular body 3. The annular seal groove 4c is held in communication with the larger-diameter chamber 5 through an axial slot 18. A piston 7a has an annular seal groove 7c defined in an outer peripheral surface thereof and receiving an annular seal 17 acting against the inner peripheral surface of the tubular plunger 4. The annular seal groove 7c is held in communication with the smaller-diameter chamber 8 through an axial slot 19. A compression coil spring 20 is disposed in the tubular plunger 4 and has ends acting on an annular spring seat 7b of the piston 7 and the bottom wall 4a of the piston 4. The compression coil spring 20 normally urges the piston 7a in a direction to project out of the upper tubular body 9.

In operation, the piston 7a is retracted into the tubular plunger 4 against the resilient force of the spring 20 under an external force applied to the acting surface 15. The pressure buildup in the smaller- and larger-diameter chambers 8, 5 is transmitted through the slots 19, 18 into the seal grooves 7c, 4c, causing said seals 17, 16 to deform. When the pressure in the chambers 8, 5 is reduced, the hydraulic pressure in the seal grooves 7c, 4c is released through the slots 19, 18, so that no pressurized oil is kept in the seal grooves 7c, 4c. This allows seals 17, 16 to be restored to their unpressurized shape when the pressure in chambers 8, 5 is reduced.

According to still another embodiment shown in FIGS. 3 and 4, there is no dust seal in the top wall 10 of the upper tubular body 9, and the upper portion of the piston 7 extends slidably through a hole 11 defined in the top wall 10. The clearance between the outer peripheral surface of the piston 7 and the inner peripheral surface of the hole 11 is selected such that no dust or foreign matter enters therethrough into the upper tubular body 9.

Since the body assembly 2 is composed of the upper and lower tubular bodies 9, 3 held in threaded engagement with each other, the body assembly 2 is of a small length, and the upper and lower tubular bodies 9, 3 can easily be ground on their inner peripheral surfaces. The shoulder 14 serves as a topper for preventing the piston 7 from being removed from the upper tubular body 9 through the hole 11. Therefore, no separate snap ring is necessary to prevent the piston 7 from being removed. The length of the piston 7 which can project out of the upper tubular body 7 remains the same even when oil leaks from the chambers 5, 8 because of the shoulder 14 which is held against the top wall 10 of the upper tubular body 7.

Although certain preferred embodiments have been shown and described, it should be understood that many changes and modifications may be made therein without departing from the scope of the appended claims.

What is claimed is:

1. A sealed-type automatic tensioner comprising:
   (a) a body assembly composed of a pair of first and second interengaging tubular bodies having top and bottom walls, respectively, said top wall having a hole defined therethrough;
   (b) a tubular plunger slidably disposed in said body assembly and having a bottom wall, said second tubular body defining a larger-diameter chamber therein axially between said bottom wall of said second tubular body and said bottom wall of said tubular plunger;
   (c) a piston slidably disposed in said tubular plunger and having a portion extending slidably through said hole in said top wall of the first tubular body, said tubular plunger having a central bore defining a smaller-diameter chamber axially between said piston and said bottom wall of said tubular plunger, said bottom wall of said tubular plunger having an aperture through which said larger- and smaller-diameter chambers communicate with each other, said larger- and smaller-diameter chambers being filled with a hydraulic medium; and
   (d) a spring disposed in said first tubular body and acting between said top wall of the upper tubular body and said tubular plunger for normally urging said tubular plunger to move in a direction into said larger-diameter chamber.

2. A sealed-type automatic tensioner according to claim 1, wherein said top wall has an annular dust seal disposed around said portion of the piston.

3. A sealed-type automatic tensioner according to claim 1, wherein said piston has in an outer peripheral surface thereof a first annular seal groove receiving an annular seal and an axial slot providing communication between said first annular seal groove and said smaller-diameter chamber, and said tubular plunger has in an outer peripheral surface thereof a second annular seal groove receiving an annular seal and an axial slot providing communication between said second annular seal groove and said larger-diameter chamber.

4. A sealed-type automatic tensioner according to claim 1, wherein said piston has an annular shoulder engageable with said top wall of the first tubular body.

5. A sealed-type automatic tensioner according to claim 1, wherein said portion of said piston extends axially slidably through said hole in said top wall.

6. A sealed-type automatic tensioner according to claim 1, further including a spring disposed in said tubular plunger and acting between said piston and said bottom wall of said tubular plunger for normally urging said portion of said piston to move in a direction projecting out of said first tubular body.

7. A sealed-type automatic tensioner according to claim 1, wherein said second tubular body is threaded in said first tubular body.

* * * * *